July 3, 1962

T. C. BALDER 3,042,792

METHOD AND DEVICE FOR THE MACHINE SOLDERING
OF A CRYSTAL TO THE CATHODE PORTION
OF CRYSTAL DIODES

Filed May 13, 1960

INVENTOR
THEODORUS CH. BALDER
BY
AGENT

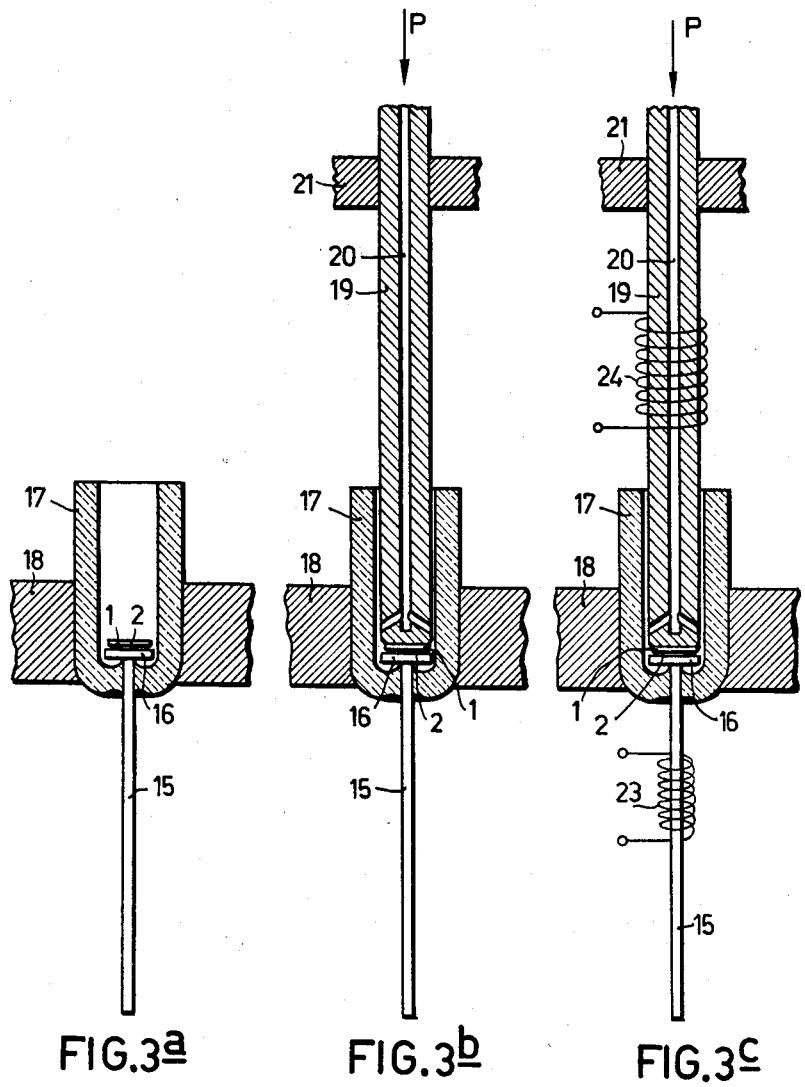

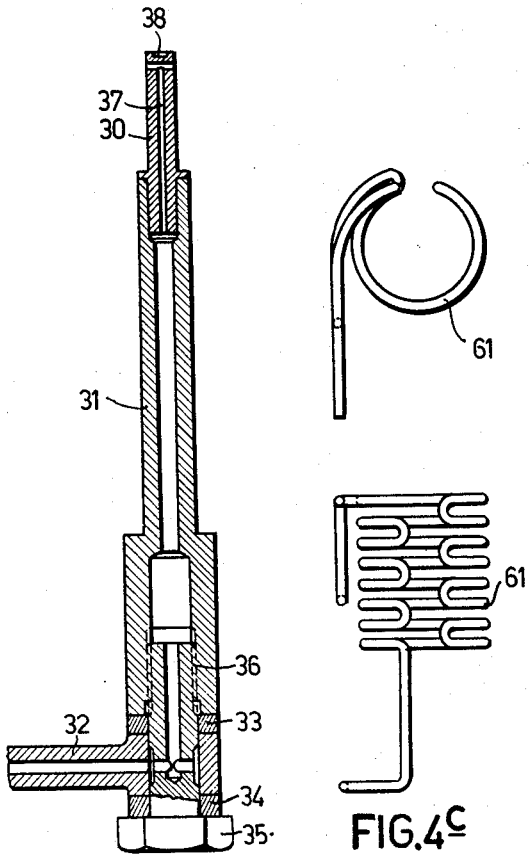
FIG.4a
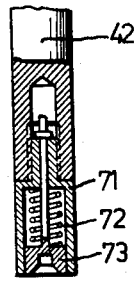
FIG.4c
FIG.4d

July 3, 1962 T. C. BALDER 3,042,792
METHOD AND DEVICE FOR THE MACHINE SOLDERING
OF A CRYSTAL TO THE CATHODE PORTION
OF CRYSTAL DIODES
Filed May 13, 1960 6 Sheets-Sheet 6

INVENTOR
THEODORUS CH. BALDER
BY
*Frank R. Trifari*
AGENT

3,042,792
METHOD AND DEVICE FOR THE MACHINE SOLDERING OF A CRYSTAL TO THE CATHODE PORTION OF CRYSTAL DIODES
Theodorus Christoph Balder, Mollenhutseweg, Nijmegen, Netherlands, assignor to North American Philips Company, Inc., New York, N.Y., a corporation of Delaware
Filed May 13, 1960, Ser. No. 29,073
10 Claims. (Cl. 219—85)

This invention relates to the machine soldering of a crystal of, for example, germanium to one end of a rod or wire with a flat disc and partly enveloped by a bulb of glass or the like. When such component parts are provided with a crystal, so-called cathode portions of crystal diodes result. Such cathode portions are known. In the manufacture of such cathode portions with crystal, which is carried out substantially by hand, the disc of the rod or wire is provided with a thin layer of solder on which a crystal is laid. Several methods can be used for soldering the crystal on the disc of the rod or wire. A usual method is, for example, the one in which heat is supplied by burners from the side to the glass wall of the bulb and hence also to the soldering area. It will be evident that the temperature of the glass bulb and more particularly of that portion which is melted to the rod or wire becomes very high, which may be considered as objectionable. In another method, the heat is supplied to the soldering area by means of a burner which is directed from above in the glass tube to the crystal, which may be considered unfavourable for the crystal itself. In a third method, a plurality of objects, together with the component part to be soldered to each object, after the interposition of a certain amount of solder, is placed as a whole in an oven. In this oven, the whole object together with the component part to be soldered is heated in a non-oxidizing atmosphere, whereby the solder starts to flow and, after being cooled, the soldering process has taken place. In this case, the soldering operation is effected without the use of a flux and the absence of a flux as such is very attractive. On the other hand, a disadvantage is the comparatively high temperature of the parts of the cathode surrounding the soldering area, whilst the process is usually discontinuous with long heating-up times of the oven.

An object of the invention is to provide a method and a device for carrying out this method in which heat can be supplied to the soldering area in a rapid manner despite the small dimensions of the cathode portions of crystal diodes, whilst the temperatures of the parts of the cathode surrounding the soldering area remain within acceptable limits. It affords the possibility of machine soldering substantially independently of the soldering person in a manner such that products such as cathode portions of crystal diodes may be provided with a crystal whilst obtaining a low and constant percentage of loss on the one hand and a large production output per hour on the other. In the method according to the invention, for this purpose a plate of solder and a crystal of, for example, germanium, which are laid one on the other, are held in position between the disc of the rod or wire and the extremity of a tube which is slidable in the bulb and with respect thereto. Subsequently, a non-oxidizing atmosphere is supplied to the interior of the bulb through the tube, the heat required for the soldering process being supplied to the soldering area at the same time from two opposite sides, that is to say through the tube and through the wire or rod. For each soldering operation as it were the situation of the oven mentioned in the foregoing is established. In the method according to the invention, reference is made to a wire or rod and a tube which can slide with respect thereto. It will be evident that either the tube can be introduced into the glass bulb or a solution may be found in sliding the glass bulb over the tube.

In another advantageous method according to the invention, steps are taken for centering the crystal and the plate of solder on the disc of the rod or wire with respect to the bulb melted to the rod or wire. In this case, a crystal and a plate of solder are successively introduced into a recess provided at the upper end of the tube and centered therein, the disc-shaped end of a wire or rod partly surrounded by a bulb being placed from above in the same recess in a centered position on top of it. As a rule, this centering of the disc-shaped end in the recess of the tube already suffices for centering the bulb around the tube. However, it is preferred to support the wire or rod also at its other end, the upper end of the wire or rod in one advantageous embodiment of the invention being supported so that the longitudinal axis of the wire or rod lies in the direction of the length of the tube.

In another advantageous embodiment of the invention, in cases where the metal disc of the rod or wire has a diameter approximately equal to the inner diameter of the glass bulb, the method of holding a plate of solder and a crystal between the disc of the rod or wire on the one hand and the tube on the other is such that a plate of solder and a crystal are successively brought on the upper side of the disc of a wire or rod partly surrounded by the bulb and, subsequently, a tube is introduced from above into the bulb. At the lower position of the tube, the plate of solder and the crystal, which lie one on the other, are then centered by the glass bulb itself and held in position by the lower end of the tube. In this case, the recess in the tube is omitted.

It has also been found that a favourable transfer of heat between the plate of solder and the crystal is obtained if these parts are held in position between the disc of the rod or wire and the end of the tube at a pressure which is adjustable per se.

A device for carrying out the method according to the invention is of the turret type or the like, it being possible in analogy with the foregoing to distinguish two main embodiments. One embodiment is of the turret type or the like comprising a plurality of soldering positions located on the same pitch circle and each comprising a tube having a recess at its upper end which can contain on one another a crystal, a plate of solder and the disc-shaped end of a rod or wire with a bulb melted thereto, which tube can be connected to a supply of a non-oxidizing gas, means for supporting the supper end of the rod or wire so that the longitudinal axis of the rod or wire lies in the direction of length of the tube, and a heating device arranged so that the heat required for soldering is supplied to the soldering area at the same time through the tube and through the rod or wire, the turret also comprising members for bringing successively a crystal and a plate of solder into the recess of the tube.

Another main embodiment for carrying out the method according to the invention is a device of the turret type or the like comprising a plurality of soldering positions located on the same pitch circle and each comprising a supporting member for the central supporting of a bulb and a rod or wire melted thereto and provided with a disc, a tube which can be connected to a supply of a non-oxidizing gas, and a heating device arranged so that the heat required for soldering can be supplied to the soldering area at the same time through the tube and through the rod or wire, the turret also comprising members for bringing successively a plate of solder and a crystal to each of the soldering positions.

In the foregoing, the devices for carrying out the method according to the invention are chosen of a design in which all of the soldering positions are located on a pitch circle, but arrangements in which the soldering positions are located in a different line, for example a straight line, are possible as well. However, an embodiment of the turret type is preferred.

The devices above described are preferably designed so that each of them can be coupled in a simple manner to a transport track in which standard holders can move on. These holders are adapted to contain component parts manufactured at another area, for example the rods or wires each with a bulb melted thereto, whilst also means are provided for taking these rods or wires from the holders and placing them in the soldering positions of the turret fully automatically and hence without contact by hand and means for taking the cathodes each provided with a crystal by means of the soldering device out of the machine and placing them in the holders on the transport track in a corresponding automatic manner.

The aforementioned method and devices permit large quantities of cathode portions per hour to be provided fully automatically with a crystal.

In order that the invention may be readily carried into effect, one embodiment thereof will now be described in detail, by way of example, with reference to the accompanying diagrammatic drawings, in which:

FIGURES 1, 2a, 2b, 2c and 3a, 3b and 3c relate to the method steps performed in accordance with the invention;

FIGS. 4a and 4d illustrate in section and in greater detail elements of the apparatus disclosed in FIG. 4.

FIG. 4c shows the heating coils in both plan and elevation views.

Figure 1:
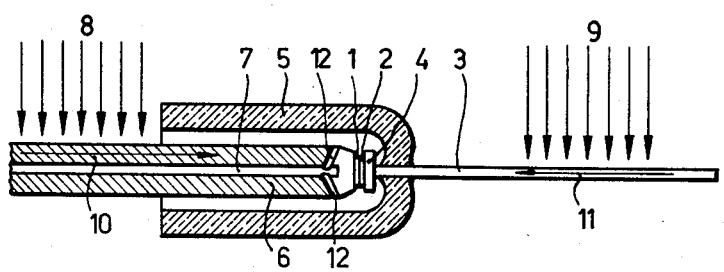

In FIGURE 1, a crystal 1 and a plate of solder 2 are held in position between a disc 4 of a wire or rod 3 partly surrounded by a bulb 5 and a tube 6 slidable with respect thereto and provided with a bore 7. Subsequently, a non-oxidizing gas is supplied through the bore 7, care being taken to ensure that the velocity and the pressure of this gas at the outlet apertures 12 are such that the air present in the bulb at the soldering area is expelled by the non-oxidizing gas. According to the invention, heat is subsequently supplied to the rod 3 and the tube 6, that is to say to those areas of the tube and the rod which are heated by devices 8 and 9 in FIGURE 1. Heat is now supplied to the soldering area at the same time through the rod 3 and the tube 6, as indicated by arrows 10 and 11. Due to this supply of heat to the soldering area, the temperature can increase to an extent such that, after a certain period of time, the plate of solder 2 starts to flow and the crystal 1 can be soldered to the disc 4. By the method according to the invention here briefly described, it can now be ensured that more particularly due to the simultaneous supply of heat through the tube 6 and the rod 3, the temperatures of the parts surrounding the soldering area remain within acceptable limits. An additional advantage is that the non-oxidizing gas supplied through the bore 7 and the tube 6 before and during soldering is also pre-heated.

Figures 2A, 2B, 2C:
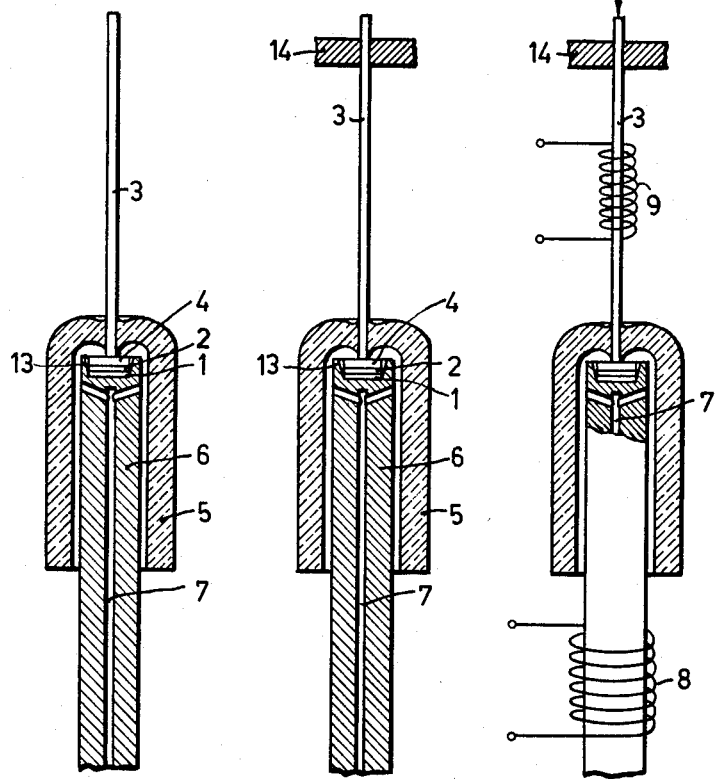

In one advantageous embodiment of the method according to the invention (FIGURE 2), a crystal 1 and a plate of solder 2 are brought successively into a recess 13 provided at the upper end of tube 6. Subsequently, the disc-shaped end 4 of a wire or rod 3, partly surrounded by a bulb 5, is placed from above on the crystal 1 and the plate of solder 2 in the manner shown in FIGURE 2a. By suitable shaping of the recess 13, it is possible for the end 4 of the wire or rod 3 to be centred therein. There is less need for centering the upper end of the wire or rod 3 according as the centering is better. However, in another advantageous embodiment of this method, supporting in a member 14 is preferred (FIGURE 2b), the more so as it is then possible in a comparatively simple manner to exert a force P in the direction of the length of the wire or rod 3. In fact, it has been found that, under certain conditions, it is desirable that the soldering operation should take place at a given adjustable pressure between the disc of the rod or wire 3 and the end of the tube 6. As a result thereof, the heat transfer between the disc 4, the plate of solder 2, the crystal 1 and the tube 6 can become even more favourable.

After the upper end of the wire or rod 3 has been supported in the member 14, this wire or rod is surrounded by a heating device 9 in a manner which will be explained more fully hereinafter.

If the inner diameter of the glass tube and the diameter of the disc-shaped end of the wire or rod 3 are such that it is not possible to use a tube having a recess for containing a crystal and a plate of solder, then in another advantageous embodiment of the method according to the invention, one proceeds in the manner as shown in FIGURE 3. In this example a cathode portion comprising a wire or rod having a disc-shaped end 16 and a glass bulb 17 melted to this wire or rod is introduced into a supporting member 18. Subsequently, a plate of solder 2 and a crystal 1 are laid on the disc 16, these parts being centred with respect to the disc 16 substantially by means of the glass bulb 17 itself (FIGURE 3a). Next, a tube 19 provided with a bore 20 and slidable in a member 21 is introduced from above into the glass bulb 17 in the manner shown in FIGURE 3b, until this tube bears on the plate of solder 2 and the crystal 1 with a force P which is otherwise adjustable. A non-oxidizing gas can now be supplied through the bore 20 of tube 19 to the lower end of this tube, followed by the arrangement of a heating device 24 around the tube 19. The ultimate situation in which heat can subsequently be supplied to the soldering area by connection of the heating devices 23 and 24 to a source of heat is shown separately in FIGURE 3c for the sake of clarity.

Figure 4:
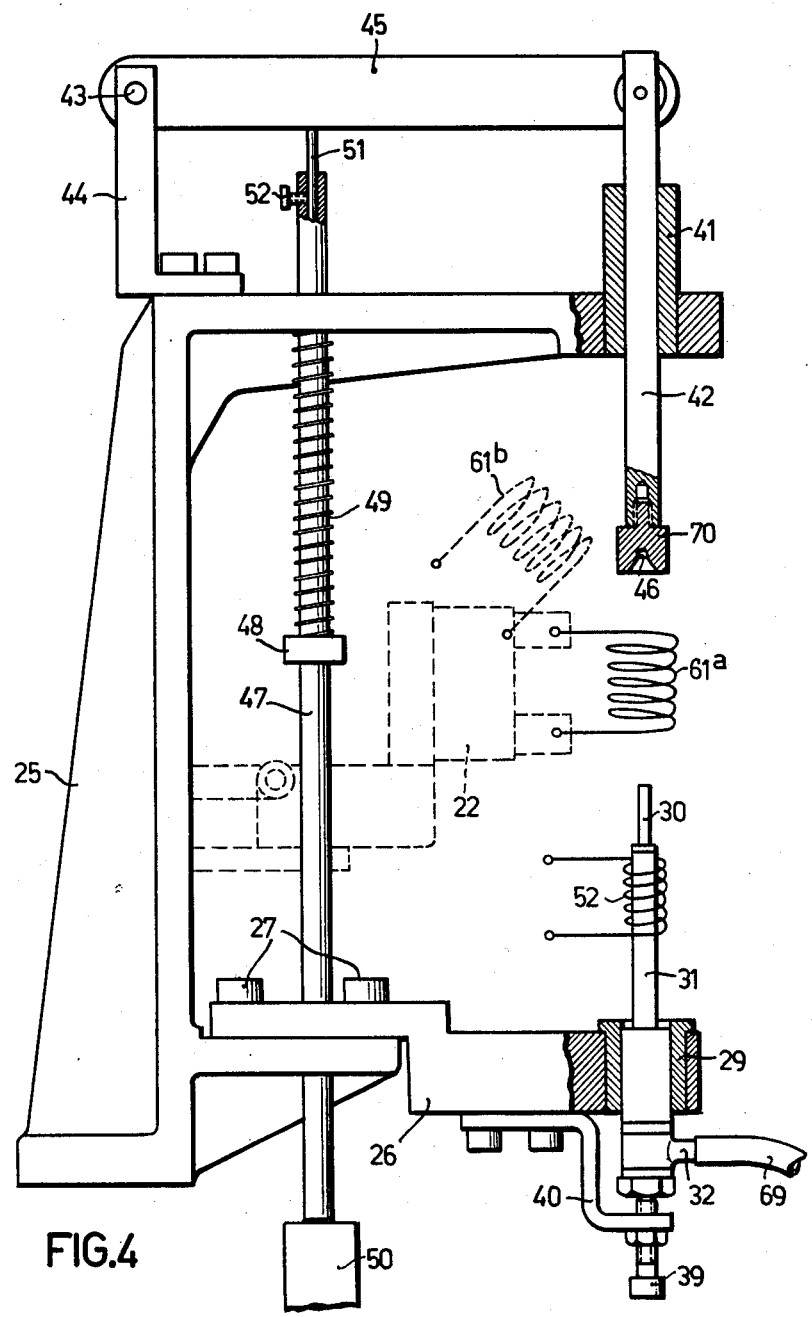
FIGURE 4 shows partly in elevation and section an apparatus for carrying out this method.
Figure 4F:
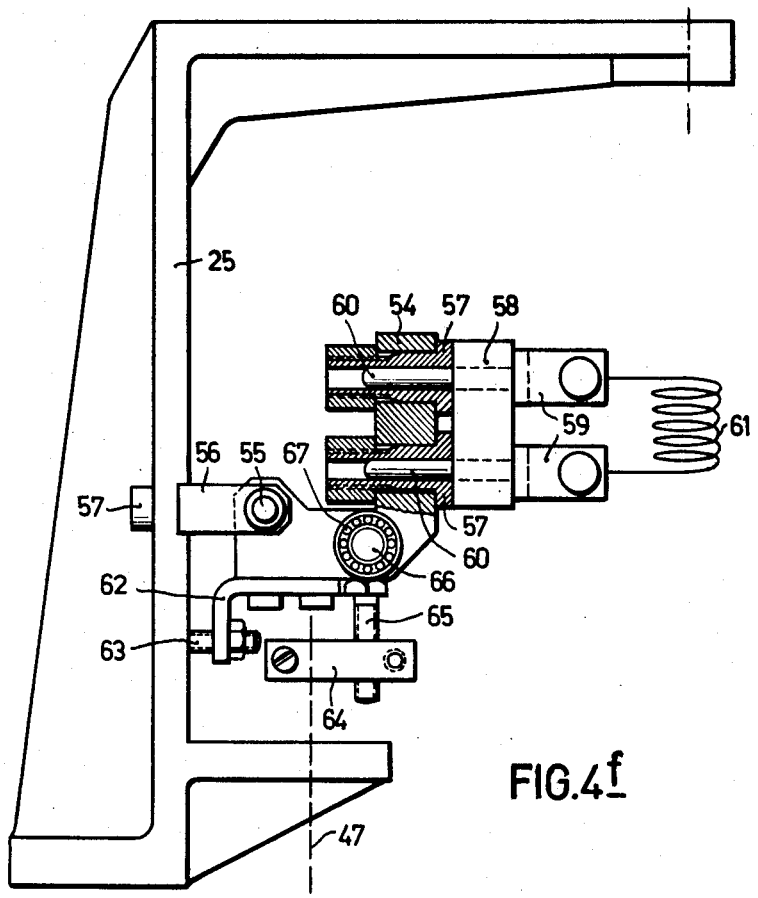
FIGS. 4b and 4f illustrate in elevation and plan views respectively a detail of the apparatus shown in FIG. 4.

As an advantageous embodiment of the method according to the invention, a device in the form of a soldering head is shown in FIGURE 4.

This device comprises a frame 25 in which a portion 26 is secured by means of bolts 27. Provided in the body 26 is a sleeve 29 in which a tube can slide. The structure of this tube is shown in greater detail in FIGURE 4a. It comprises an upper piece 30, a tube 31 and a connecting piece 32 which is enclosed between rings 33 and 34 by means of a bolt 35 having a threaded end 36 and which can be connected to a supply of non-oxidizing gas. This supply of gas can penetrate through channels in 32, 35 and 31 to a channel 37 of the upper piece 30. The latter is provided at its upper end with a recess 38. As may be seen from FIGURE 4, the lowest position which the slidable tube 31 can assume is determined by a bolt 39 which is displaceable in a strip 40. The frame 25 is also provided with a guide sleeve 41 in which a pin 42 having a sleeve 70 provided at its end can slide in a vertical direction. The pin 42 is connected to an arm 45 which can pivot about a shaft 43 of a support 44. A rod 47 which is slidably arranged in the frame 25 and the movement of which is commanded by a cam 50 is provided with a ring 48 and a spring 49. The upward and downward movements of the pin 42 are effected by means of the cam 50 and the spring 49, respectively. The rod 47 is also provided with a pin 51 which is adjustable with respect to rod 47 by means of a bolt 52.

Figure 4B:
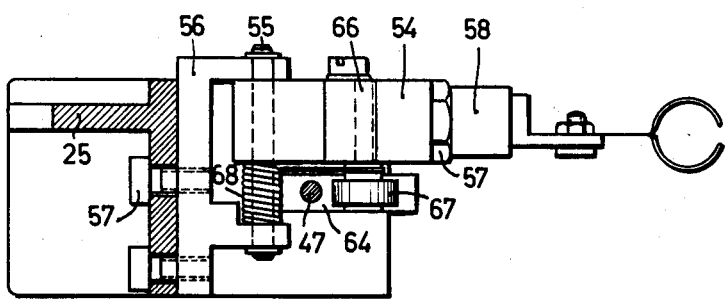

The device of FIGURE 4 comprises two electrical heating devices, one of which, indicated by 52, is shown only diagrammatically. It is fixedly arranged around the tube 31. The other heating device is indicated by 61a and designed so that it can be turned away. The means for turning away the coil 61a towards the position indicated by 61b are present at the cross-hatched area 22 and shown separately in FIGURE 4b for the sake of clarity. In this figure a holder 54 of insulating material can turn about a shaft 55 provided in body 56 which is secured to frame 25 by means of bolts 57. The holder 54 is also provided with two plug sockets 57 into which the ends 60 of plugs 59 can be introduced through a distance block 58 of insulating material. An electric heating device 61 is connected to these plugs. For energizing the coil 61, the two plug sockets 57 are connected to a current source in a manner otherwise not shown. For fixing the lower position of the pivotal holder 54, this holder has secured to it a strip 62 having an adjustable stop bolt 63. At the lower position of holder 54, the coil 61, the shape of which may otherwise be seen from FIGURE 4c, is in line with the pin 42, which position is indicated by 61a in FIGURE 4 for the sake of clarity. A clamping block 64 having an adjustable bolt 65 is secured to the rod 47, which is indicated by a dashed line in FIGURE 4b. During the upward movement of the rod 47, the clamping block 64 follows this movement and, during a portion thereof, pushes against a ball bearing 67 arranged on the shaft 66 so that the holder 54 can pivot about the shaft 55. The heating device 61 then assumes a position as indicated by 61b in FIGURE 4. During the downward movement of the rod 47, the ball bearing 67 follows this movement due to the presence of a torsion spring 68 which surrounds the shaft 55 and is connected to the holder 54 and the body 56, respectively.

The described soldering device operates as follows: By means of the cam 50, the rod 42 can be moved upwards and the coil 61 brought into the position 61b. Subsequently, a crystal and a plate of solder are introduced into the recess 38 (FIGURE 4a) in a manner such that they come to lie therein one on the other. A cathode wire having a disc-shaped end and partly surrounded by a bulb is then placed with its disc-shaped end in the recess 38. Subsequently, the rod 47 is moved downwards so that the rod or wire is supported at its upper end. As the rod 47 moves down further, the coil 60 which is open at one side is brought round the wire 61a due to the sinking of the holder 54. A non-oxidizing gas is now supplied through a tubing 69 and via the tube 31 to the soldering area and the coils 52 and 61 are simultaneously energized for some time, whereby the plate of solder starts to flow and a soldered connection can be established.

In order to decrease, during the downward movement of the rod 42, the influence of the inertia forces of the moving parts upon the upper end of the wire or rod with bulb brought between the tube 30 and the recess 46 provided in the sleeve 70, use may be made of a structure as shown in FIGURE 4d. In this figure, the sleeve 70 is replaced by a part 71 in which a supporting block 73 can slidably move against the action of a spring 72.

Figure 5:
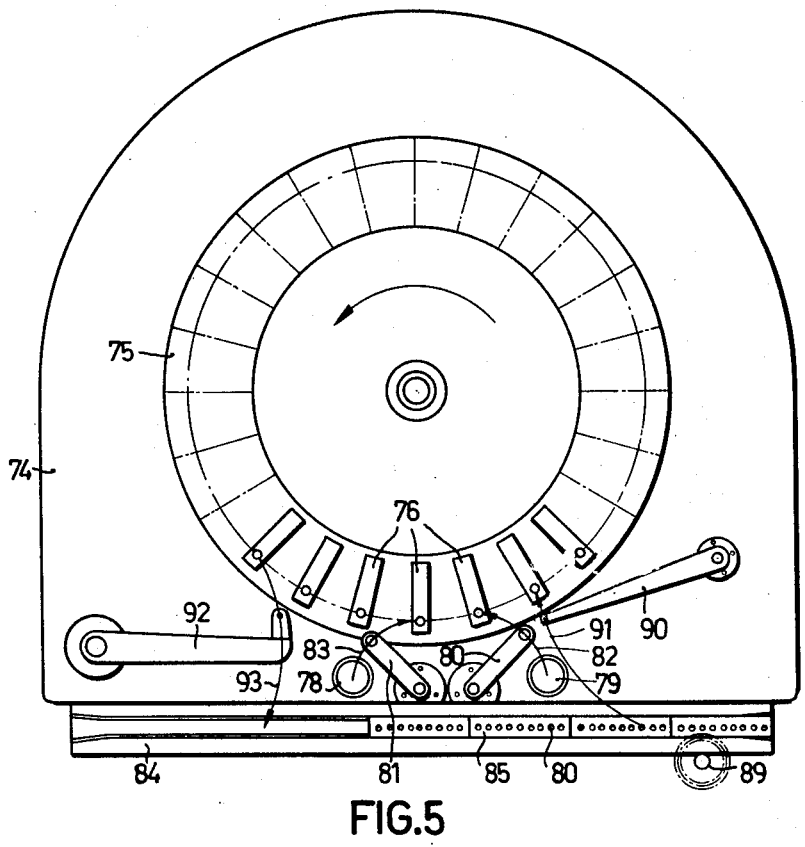
FIGURE 5 is a diagrammatic plan view of a turret equipped with a number of soldering positions as shown in FIGURE 4.

FIGURE 5, at last, shows diagrammatically a device comprising a frame 74 and a table 75 which can rotate thereon in a stepwise manner and which is provided with a plurality of soldering positions 76 located on a pitch circle. Each soldering position is of a structure as described with reference to FIGURE 4. Two containers 78 and 79 for crystals and plates of solder and two mechanisms 80 and 81, which can perform swinging movements 82 and 83, are provided for bringing crystals and plates of solder to the recesses 38 in the tubes of the soldering heads.

Figure 6:
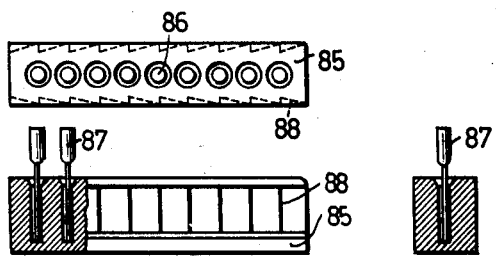
FIGURE 6 shows a transport holder.

The turret can be connected to a transport track 84 in which holders 85 can be moved on. As may be seen from FIGURES 5 and 6, these holders are provided with a plurality of apertures 86 into which rods or wires of the cathodes either not soldered or soldered can be inserted. This is indicated by 87 in the figure. The holders are also provided with a plurality of teeth 88, the number of teeth of each holder corresponding to the number of apertures 86 of each holder. The transport track 84 is provided with a ratchet mechanism 89 for the stepwise movement of a plurality of holders 85 positioned one after another. This transport of the holders over the track is synchronized with the stepwise rotation of the table 75 so that each time the table is turned one step, all of the holders are moved on one tooth on the transport track. Between the transport track and the turret there are also provided a member 90 for taking the rods or wires each with a bulb melted thereto out of the holders and placing them in the soldering heads via a path 91, together with a member 92 for taking cathode wires each having a crystal soldered thereon out of the soldering heads and placing them in the holders on the transport track via a path 93.

In conclusion, the device above described comprises a number of members (otherwise not shown in FIGURE 5) for blocking several movements by electromagnetic means, the blocking being such that if, for example, a crystal is not supplied to the soldering head, neither a plate of solder nor a rod or wire with bulb is supplied, while the electrical heating devices of the relevant soldering position are not energized.

What is claimed is:

1. A method of machine soldering a crystal to one end of a rod provided with a flat disc comprising placing a glass bulb around said disc and a portion of said rod, inserting a quantity of solder and a crystal which are superposed between the disc and the end of a tube that is slidable in said glass bulb, supplying a non-oxidizing atmosphere to said glass bulb through said tube, and supplying heat for soldering to the soldering area simultaneously from two opposing sides through the tube and through said rod.

2. A method of machine soldering a crystal to one end of a rod provided with a flat disc as claimed in claim 1 wherein said crystal and solder are placed in a recess in end of said tube, the flat disc on said rod being centered in said recess with the rod in the longitudinal direction of the tube.

3. A method of machine soldering a crystal to one end of a rod provided with a flat disc comprising placing a glass bulb around said disc and a portion of said rod, inserting a plate of solder and a crystal which are superposed between the disc and the end of a tube that is slidable in said glass bulb, supplying a nonoxidizing atmosphere to said glass bulb through said tube, supplying heat for soldering to the soldering area simultaneously from two opposing sides through the tube and through said rod, and supporting the upper end of said rod whereby the longitudinal axis of said rod lies in the direction of length of said tube.

4. A method of machine soldering a crystal to one end of a rod provided with a flat disc comprising placing a glass bulb around said disc and a portion of said rod, inserting a plate of solder and a crystal which are superposed between the disc and the end of a tube that is slidable in said glass bulb, supplying a non-oxidizing atmosphere to said glass bulb through said tube, supplying heat for soldering to the soldering area simultaneously from two opposing sides through the tube and through said rod, said tube being introduced into said glass bulb from above with its lower end holding said crystal and superposed plate of solder in said glass bulb.

5. A method of machine soldering a crystal to one end of a rod provided with a flat disc as claimed in claim 1 further comprising holding said plate of solder and crystal in position between the disc of the rod and the tube by means of adjustable pressure.

6. An apparatus for machine soldering a crystal to one end of a rod provided with a flat disc in a glass bulb comprising a turret having a plurality of soldering positions located thereon, each of said soldering positions including a tube having a recess at its upper end for seating said crystal, the flat disc at the end of said rod and an amount of solder, means for supplying a non-oxidizing gas through said tube to said apparatus, means for supporting the upper end of said rod whereby the longitudinal axis of the rod lies in the direction of the length of the tube, a heating device arranged so that the heat required for soldering can be supplied to the soldering area simultaneously through the tube and through said rod, and members on said turret for successively transporting a crystal and an amount of solder to each of the soldering positions.

7. An apparatus for machine soldering a crystal to one end of a rod provided with a flat disc in a glass bulb comprising a turret having a plurality of soldering positions located thereon, each of said soldering positions including a tube having a recess at its upper end for seating said crystal, the flat disc at the end of said rod and an amount of solder, means for supplying a non-oxidizing gas through said tube to said apparatus, means for supporting the upper end of said rod whereby the longitudinal axis of the rod lies in the direction of the length of the tube, a heating device arranged so that the heat required for soldering can be supplied to the soldering area simultaneously through the tube and through a said rod, and members on said turret for successively transporting an amount of solder and a crystal to each of the soldering positions.

8. An apparatus for machine soldering a crystal to one end of a rod provided with a flat disc in a glass bulb as claimed in claim 6 further comprising means for pinching said crystal and the amount of solder which are superposed between the end of the tube and the flat disc on the rod together with the glass bulb.

9. An apparatus for machine soldering a crystal to one end of a rod provided with a flat disc in a glass bulb as claimed in claim 6 wherein said heating device is an electrical heating unit.

10. An apparatus for machine soldering a crystal to one end of a rod provided with a flat disc in a glass bulb comprising a turret having a plurality of soldering positions located thereon, each of said soldering positions including a tube having a recess at its upper end for seating said crystal, the flat disc at the end of said rod and an amount of solder, means for supplying a non-oxidizing gas through said tube to said apparatus, means for supporting the upper end of said rod whereby the longitudinal axis of the rod lies in the direction of the length of the tube, a heating device arranged so that the heat required for soldering can be supplied to the soldering area simultaneously through the tube and through said rod, a transport track for supplying cathode wires each with a bulb melted thereto and for discharging soldered cathode portions, a plurality of transport holders for receiving said soldered cathode portions, means for taking each of the rods with respective bulbs out of said holders and inserting them in the soldering positions of said turret, and a device for removing the cathode portions each with a crystal soldered thereon out of the apparatus and placing them in the holders on said transport track.

References Cited in the file of this patent

UNITED STATES PATENTS

| | | |
|---|---|---|
| 1,648,010 | Taylor | Nov. 8, 1927 |
| 1,743,519 | Bardet et al. | Jan. 14, 1930 |
| 1,876,821 | Dugan | Sept. 13, 1932 |
| 2,480,351 | Anderson | Aug. 30, 1949 |
| 2,792,489 | Wohlman | May 14, 1957 |
| 2,794,899 | Plummer | June 4, 1957 |
| 2,795,687 | Hall et al. | June 11, 1957 |
| 2,869,056 | Roovers et al. | Jan. 13, 1959 |
| 2,894,112 | Brescka et al. | July 7, 1959 |
| 2,928,931 | Hoopes et al. | Mar. 15, 1960 |
| 2,939,058 | Masterson | May 31, 1960 |